United States Patent
Bouhnik et al.

(10) Patent No.: US 9,625,310 B2
(45) Date of Patent: Apr. 18, 2017

(54) SYSTEMS AND METHODS FOR SORTING AND SUMMING SIGNALS FROM AN IMAGING DETECTOR

(71) Applicant: General Electric Company, Schenectady, NY (US)

(72) Inventors: Jean-Paul Bouhnik, Zichron Yaacov (IL); Yaron Hefetz, Kibbutz Alonim (IL)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 14/569,002

(22) Filed: Dec. 12, 2014

(65) Prior Publication Data

US 2016/0169737 A1 Jun. 16, 2016

(51) Int. Cl.
*G01J 1/42* (2006.01)
*G01T 1/164* (2006.01)
*G01J 1/44* (2006.01)

(52) U.S. Cl.
CPC ............ *G01J 1/4228* (2013.01); *G01T 1/164* (2013.01); *G01T 1/1647* (2013.01); *G01J 2001/442* (2013.01)

(58) Field of Classification Search
CPC ......... G01J 1/4228; G01J 1/164; G01J 1/1647
See application file for complete search history.

(56) References Cited

U.S. PATENT DOCUMENTS 9,002,084 B2 * 4/2015 Shahar .................. G01T 1/1647
382/128

2007/0023669 A1 * 2/2007 Hefetz .................... A61B 6/032
250/370.14
2011/0155899 A1 * 6/2011 Dror ........................ G01T 1/171
250/252.1
2015/0063671 A1 * 3/2015 Shahar .................. G01T 1/1647
382/132

* cited by examiner

*Primary Examiner* — David Porta
*Assistant Examiner* — Mindy Vu
(74) *Attorney, Agent, or Firm* — Dean D. Small; The Small Patent Law Group, LLC

(57) ABSTRACT

A system includes a detector and a main processing unit having an event processing module. The detector includes pixels to detect an event corresponding to photon absorption. The event processing module is configured to read event information for each event detected by each pixel of the detector in order of receipt from the detector and to compare an energy level value in the event information for each event to a predetermined range of energy level values. An event is counted when the energy level value is within the predetermined range of energy level values. For each event having an energy level below the predetermined range, the energy level value for a next consecutive event in the received event information is read and a combined energy level value of the event and the next consecutive event is determined as well as the pixel locations of the event and the next consecutive event. The combined energy level is counted as a single event when the combined energy level value is within a predetermined range of energy level values and when the pixel location for the event is near a pixel location for the next consecutive event. At least one pixel location is assigned to the single event.

21 Claims, 8 Drawing Sheets

SYSTEMS AND METHODS FOR SORTING AND SUMMING SIGNALS FROM AN IMAGING DETECTOR

CROSS-REFERENCE TO RELATED APPLICATIONS

This application is related to co-pending U.S. application Ser. No. 14/014,726, filed Aug. 30, 2013.

BACKGROUND

Detectors for diagnostic imaging systems, for example, detectors for single photon emission computed tomography (SPECT) and computed tomography (CT) imaging systems are often produced from semiconductor materials, such as Cadmium Zinc Telluride (CdZnTe), often referred to as CZT, Cadmium Telluride (CdTe) and Silicon (Si), among others. These semiconductor detectors typically include arrays of pixelated detector modules.

Ideally, photon absorption (an event) occurs in a single pixel. However, in pixelated detectors, charge-sharing between two or more adjacent pixels may occur. Charge-sharing is caused by photon absorption in a gap between adjacent pixels. Charge-sharing events cause each of the associated signals for the pixels to be out of a photo-absorption energy window, and, therefore, rejected as being generated by photons that suffer from Compton Scattering in the body of a patient, which are not suitable for imaging purposes.

Also, Compton Scattering may occur in the detector, with the amount of Compton Scattering inside the detector increasing with photon energy. Photons absorbed in the detector may be absorbed by one step including photo-electric absorption or by a series of multiple steps including one or more steps of Compton Scattering that ends with photo-electric absorption. Compton Scattering may occur in several adjacent pixels. In such a case, the energy of the photon is absorbed and shared between several pixels, causing each of the signals for the pixels to be out of the photo-absorption energy window. Such signals may thus be interpreted as being generated by photons that suffer Compton Scattering in the patient body and rejected.

Neighbor summing (summing signals received in adjacent pixels to recover the energy of neighboring pixels into one signal that is located within the photo-electric absorption energy window) may be attempted to address these issues. Conventionally, neighbor summing may be performed by a variety of techniques including verifying if the signals are in time coincidence within a specified time window.

However, such neighbor summing is not without drawbacks. For example, the determination or verification of whether signals are in time coincidence may present drawbacks. In CZT detectors, for example, the timing of a trigger signal indicating timing proportional to the absorption time of a photon in a pixel depends on the depth of interaction (DOI) of the absorbed photon in the detector. Thus, the timing of the trigger signal is strongly dependent on the DOI and therefore is not accurate enough to serve for time coincident measurements. Accordingly, the trigger signal may be derived from the cathode of the CZT detector. The cathode is a large contact and may produce a trigger signal immediately upon absorption of a photon in the detector. However, deriving the trigger signal from the cathode is difficult to implement because the signal is noisy. Also, the signal may need to be fed into an input from a remote distance. The relatively high noise produced by a large cathode requires the use of a relatively high threshold level in the input of a comparator in an electronic channel of a pixel to prevent propagation, in the electronic channels of the detector pixels, of the relatively high noise produced by the large cathode. The use of the high threshold level also causes rejection of all signals below the relatively high threshold level. Thus, many events for which charges are shared between pixels may be rejected as being too small due to the required high threshold level when the signal is derived from the cathode. As a result, the summing process may be inefficient when using timing derived from the cathode contact. Additionally, adding timing circuitry to the camera's hardware may require modification of the front end electronics. This may add to the complexity, price and energy consumption (hence heat generation) of the front end electronics.

BRIEF DESCRIPTION OF THE INVENTION

In accordance with various embodiments, systems and methods are provided for processing event information generated during an imaging process. A detector is coupled to a main processing unit having an event processing module. The event processing module is configured to read the event information for each event detected by each of the pixels of the detector during the imaging process in order of receipt from the detector and compare an energy level value in the event information for each event to a first predetermined range of energy level values. An event is counted for image reconstruction when the energy level value in the event information is within the first predetermined range of energy level values. For each event having an energy level value below the predetermined range, the energy level value for a next consecutive event received from the detector is read and the combined energy level value of the event and the next consecutive event. In addition, the event processing module determines whether a pixel location for the event is near a pixel location for the next consecutive event and the combined energy level of the event and the next consecutive event is counted as a single event when the combined energy level value is within a second predetermined range of energy level values and the pixel location of the event is near the pixel location of the next consecutive event. At least one pixel location is assigned to the single event. In some embodiments the event processing module is a software module executed in a general purpose computer such as a PC.

In accordance with various embodiments, a method is provided that includes reading event information for each event detected by each pixel of a multi-pixel detector during an imaging process in order of receipt from the detector and comparing an energy level value of an event in the event information for each event to a first predetermined range of energy level values. An event is counted when the energy level value in the event information is within the first predetermined range of energy level values and for each event having an energy level value below the first predetermined range, the energy level value for a next consecutive event is read in the order of event information received from the detector. A combined energy level value of the event and the next consecutive event is determined and it is determined whether a pixel location for the event is near a pixel location for the next consecutive event. The method further includes counting the combined energy level value as a single event when the combined energy level value is within a second predetermined range of energy level values and when the pixel location of the event is near the pixel location for the at least one next consecutive event, and assigning at least one pixel location for the single event.

DETAILED DESCRIPTION OF THE INVENTION

Figure 1:
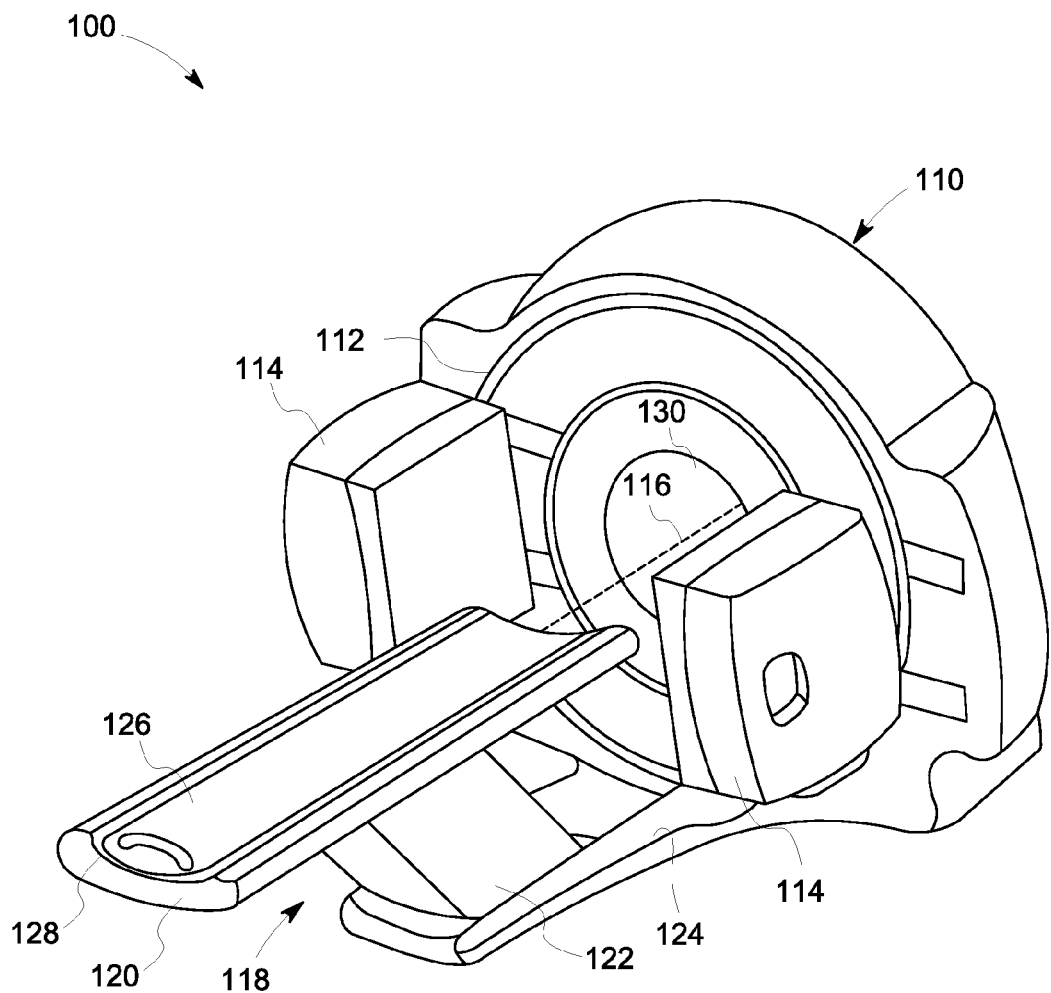
FIG. 1 is a perspective view of an exemplary imaging system constructed in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

"Systems," "units," or "modules" may include or represent hardware and associated instructions (e.g., software stored on a tangible and non-transitory computer readable storage medium, such as a computer hard drive, read only memory (ROM), random access memory (RAM), dynamic RAM or DRAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide systems and methods for sorting events detected by the pixels of a detector, and summing energies of pixels associated with charge-sharing events without utilizing or requiring the use of time-coincidence measurements, timing of reading cycles or "acquisition cycle," or "windowing" to identify events that occur close in time. More particularly, embodiments disclosed herein provide systems and methods for processing events and associated event information from a detector in the order in which the events are detected and event information is received, and combining or summing energies of pixels associated with charge-sharing events, where the processing can be performed substantially in real-time or offline. Event information from a detector or camera is supplied to a main processing unit of an imaging system that is capable of processing the event information quickly, including event information associated with charge-sharing events. More particularly, the processing capability of the main processing unit is significantly greater than the processing capability of a processor that may be located in the camera or on or near the detector such as an application specific integrated circuit (ASIC) or field programmable array (FPGA) or other similar electronic devices or integrated processors, for example. As a result, the event information according to various embodiments can be processed in order of receipt, and substantially in real-time, if desired.

According to various embodiments, no windowing is performed and event information used for processing events may include, but not be limited to, pixel address information and energy or energy level value. The event information for each event is stored, at least temporarily, as a chronological list. Since there may be delays and bus-busy effects, for example, the list may not be completely accurate in terms of chronology. However, it is unlikely that events that occurred at the same time (split event or charge-sharing event) will be separated by more than a few or small number of places (Maximum Displacement or MD) in the list. The Maximum Displacement between events of a charge-sharing event may be found as a function of the event rate, which can be determined by counting events in a known time interval, may be predetermined or set, be a default value, or be set automatically.

In various embodiments, the list of events and corresponding event information is filtered or sorted to identify valid events occurring at respective pixels to be counted for image reconstruction, and to identify event pairs or multiple events associated with a split event or a charge-sharing event. In these embodiments, the list is sorted to identify event pairs or multiple events corresponding to a charge-sharing event that are separated by less than the MD in the list, and are associated with pixels that are near each other, such as adjacent pixels including pixels that share a boundary line, all adjacent pixels, and other pixels, even on a nearby detector module, for example. When such event pairs or multiple events are found, their energies are summed, and if the sum is within a predetermined range of energy level values, as discussed herein, then the combined event is counted as an event for image reconstruction. According to various embodiments, the pixel location for such an event may be assigned to one of the pixels of the charge-sharing event (e.g., pixel with higher energy), a virtual pixel location calculated based on the pixel locations of the pixels of the charge-sharing event, or split as two partial events (or multiple partial events) in the pixels associated with the charge-sharing event.

It should be noted that although various embodiments are described in connection with nuclear medicine (NM) imaging systems having particular components, including specific configurations or arrangements of pixelated detectors, the various embodiments are not limited to nuclear medicine imaging systems or the specific pixelated detectors described herein. Accordingly, the various embodiments may be implemented in connection with any type of imaging system, for example, medical diagnostic imaging (e.g., CT or X-ray system), non-destructive imaging, etc. The various embodiments provide pixelated detectors that detect photons, such as emission gamma ray photons or transmission x-ray photons.

An exemplary imaging system according to various embodiments is shown in FIG. 1. In this embodiment, the imaging system 100 is a SPECT imaging system. The system 100 includes an integrated gantry 110 that further includes a rotor 112 oriented about a gantry central bore 130. The rotor 112 is configured to support one or more NM pixelated cameras 114 (two cameras 114 are shown), such as, but not limited to gamma cameras, SPECT detectors, multi-layer pixelated cameras (e.g., Compton camera) and/or PET detectors. It should be noted that when the imaging system 100 includes a CT camera or an x-ray camera, the imaging system 100 also includes an x-ray tube (not shown) for emitting x-ray radiation towards the detectors. In various embodiments, the cameras 114 are formed from pixelated detectors. The rotors 112 are further configured to rotate axially about an examination axis 116.

A patient table 118 may include a bed 120 slidingly coupled to a bed support system 122, which may be coupled directly to a floor or may be coupled to the gantry 110 through a base 124 coupled to the gantry 110. The bed 120 may include a stretcher 126 slidingly coupled to an upper surface 128 of the bed 120. The patient table 118 is configured to facilitate ingress and egress of a patient (not shown) into an examination position that is substantially aligned with examination axis 116. During an imaging scan, the patient table 118 may be controlled to move the bed 120 and/or stretcher 126 axially into and out of a bore 130. The operation and control of the imaging system 100 may be performed in any manner known in the art. It should be noted that the various embodiments may be implemented in connection with imaging systems that include rotating gantries or stationary gantries.

Figure 2:
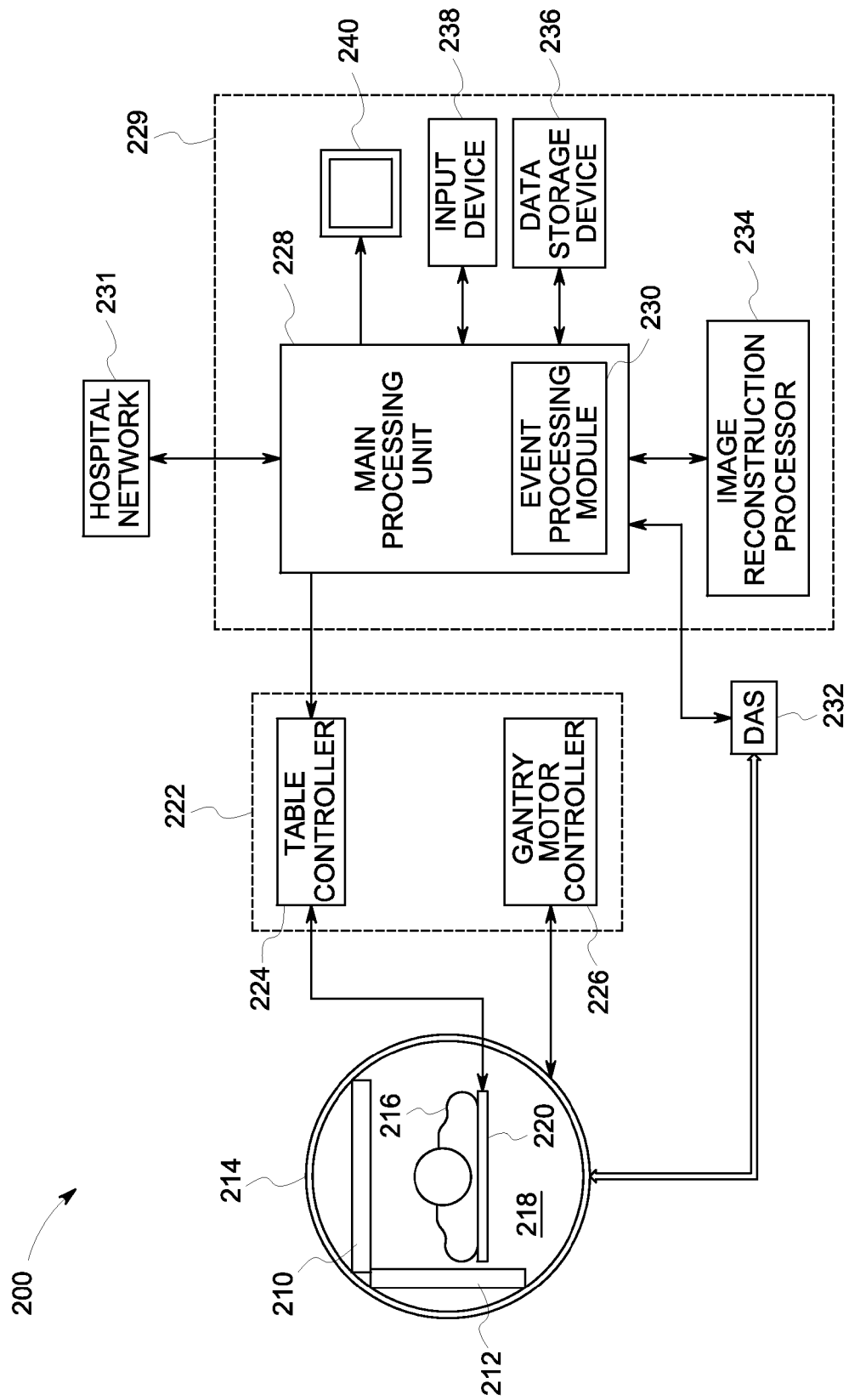
FIG. 2 is a block diagram of an imaging system constructed in accordance with various embodiments.

FIG. 2 is a block diagram illustrating an imaging system 200 that has a plurality of cameras each including pixelated imaging detectors mounted on a gantry. It should be noted that the imaging system may also be a multi-modality imaging system, such as an NM/CT imaging system. The imaging system 200, illustrated as a SPECT imaging system, generally includes a plurality of cameras having pixelated imaging detectors 210 and 212 (two are illustrated) mounted on a gantry 214. It should be noted that additional cameras may be provided. In various embodiments, the cameras 210, 212 may be, for example, general purpose cameras or non-general purpose cameras. Each camera 210, 212 includes a detector that may include a plurality of detector modules. Each detector comprises cells or pixels for detecting events or the receipt of energy during image scanning. The cameras 210 and 212 are located at multiple positions (e.g., in an L-mode configuration) with respect to a patient 216 in a bore 218 of the gantry 214. The patient 216 is supported on a patient table 220 such that radiation or imaging data specific to a structure of interest (e.g., the heart) within the patient 216 may be acquired. It should be noted that although the cameras 210 and 212 are configured for movable operation along (or about) the gantry 214, in some imaging systems, imaging detectors are fixedly coupled to the gantry 214 and in a stationary position, for example, in a PET imaging system (e.g., a ring of imaging detectors). It also should be noted that the cameras 210 and 212 may have detectors formed from different materials and provided in different configurations known in the art.

One or more collimators may be provided in front of the radiation detection face (not shown) of one or more of the imaging detectors of the cameras 210 and 212. The imaging detectors of the cameras 210 and 212 acquire a 2D image that may be defined by the x and y location of a pixel and the location of the imaging detectors of the cameras 210 and 212. The radiation detection face (not shown) is directed towards, for example, the patient 216, which may be a human patient or animal. It should be noted that the gantry 214 may be configured in different shapes, for example, as a "C", "H" or "L".

A controller unit 222 may control the movement and positioning of the patient table 220 with respect to cameras 210 and 212 and the movement and positioning of the cameras 210 and 212 with respect to the patient 216 to position the desired anatomy of the patient 216 within the fields of view (FOVs) of the imaging detectors of the cameras 210 and 212, which may be performed prior to acquiring an image of the anatomy of interest. The controller unit 222 may have a table controller 224 and a gantry motor controller 226 that each may be automatically commanded by a main processing unit 228 main controller 229, manually controlled by an operator, or a combination thereof. In various embodiments, the main controller 229 is a general purpose computer that communicates with a hospital network 231, for example. The main processing unit 228 includes an event processing module 230 that processes events received from the imaging detectors of the cameras 210 and 212. The event processing module 230 may be implemented in software, hardware, or any combination thereof. In some embodiments the event processing module 230 is a software module executed in a general purpose computer such as a PC. The table controller 224 may move the patient table 220 to position the patient 216 relative to the FOV of the imaging detectors of the cameras 210 and 212. Additionally, or optionally, the cameras 210 and 212 may be moved, positioned or oriented relative to the patient 216 or rotated about the patient 216 under the control of the gantry motor controller 224.

The imaging data may be combined and reconstructed into an image, which may comprise 2D images, a 3D volume or a 3D volume over time (4D). A Data Acquisition System (DAS) 232 receives analog and/or digital electrical signal data produced by the imaging detectors of the cameras 210 and 212 and decodes the data for subsequent processing as described in more detail herein. The event processing module 230 receives the data from the DAS 232 and processes event information received from the DAS 232 to identify events to be used during image reconstruction. An image reconstruction processor 234 receives processed event information from the event processing module 230 and reconstructs an image using any reconstruction process known in the art. A data storage device 236 may be provided to store data from the DAS 232 or reconstructed image data. An input device 238 also may be provided to receive user inputs and a display 240 may be provided to display reconstructed images.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

Figure 3:
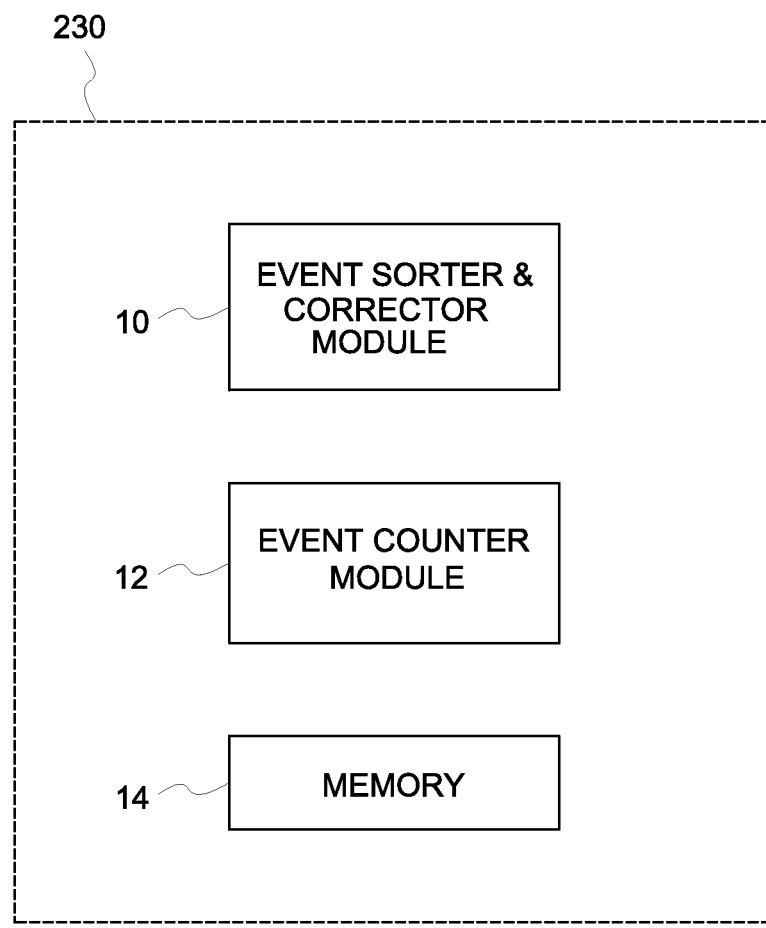
FIG. 3 is a schematic view of a processing module in accordance with various embodiments.

FIG. 3 is a block diagram illustrating an embodiment of the event processing module 230. The event processing module 230 includes an event sorter and corrector module 10, an event counter module 12, and a memory 14. Each of the modules may be implemented in software, hardware or a combination thereof. Events, including combined events, to be counted for image reconstruction are determined by the event processing module 230 based on received event information. The event counter module 12 is configured to keep or maintain a running count of events for each pixel acquired during the image scanning process. When a scan is complete, the counter module 12 may assign a level on a grayscale for each pixel corresponding to that pixel's total number of counted events. For example, brighter shades may be used for pixels having higher counts. The image from the scanning process may be reconstructed using the shade or grayscale value of each pixel for a corresponding pixel or portion of the image.

Figure 4:
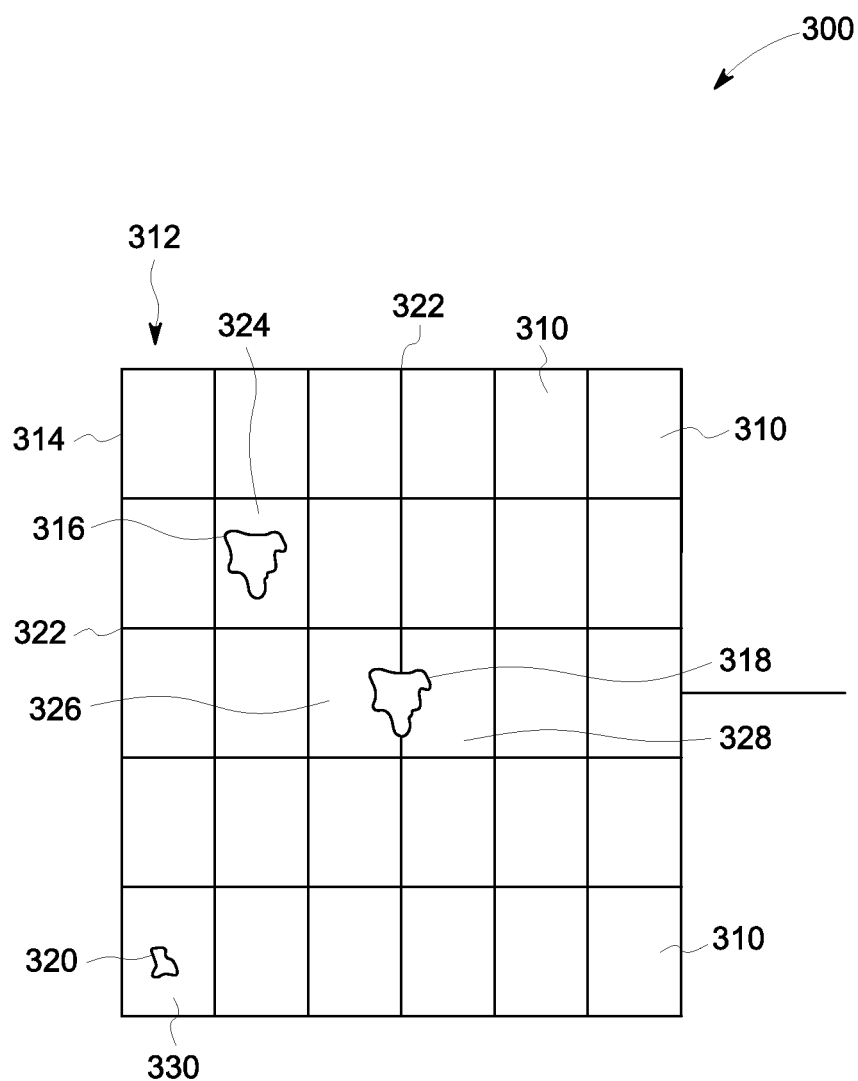
FIG. 4 is a top perspective view of a pixelated photon detector formed in accordance with one embodiment.

FIG. 4 provides a schematic view of a pixelated detector 300 in accordance with various embodiments. The detector 300 detects events corresponding to an imaging scan (e.g., received photons of a NM scan). The detector 300 may include multiple pixels or multiple modules having multiple pixels, with each pixel configured to detect an event corresponding to the receipt of energy by the pixel. For example, the energy may be received during a NM scan, with energy from a radiopharmaceutical previously administered to a patient being received by one or more pixels of the detector 300 during the scan. In the illustrated embodiment, the detector 300 includes pixels 310 arranged in columns 312 and rows 314. The pixels 310 are separated by gaps 322. Event information, including energy levels received by one or more pixels, is provided to the event processing module 230. Based on the energy levels, the event processing module 230 may determine if a detected event is suitable for use in imaging (e.g., whether the event should be counted or not). Three example types of events are depicted in FIG. 4. A first event 316 corresponds to an event that corresponds to an event that should be counted corresponding to incidence of a photon from an administered radiopharmaceutical being received entirely by a single pixel 324. A second event 318 corresponds to an event that should be counted corresponding to incidence of a photon from an administered radiopharmaceutical being received by two adjacent pixels 326, 328 (as well as a gap between the pixels 326, 328). A third event 320 corresponds to energy received by a single pixel 330 that does not correspond to an event that should be counted.

Generally, in various embodiments, the event processing module 230 of the main processing unit 228 may be configured to execute one or more algorithms to perform functions or operations described herein. The one or more algorithms may include aspects of embodiments disclosed herein, whether or not expressly identified in a flowchart or as a step of a method.

Figure 5:
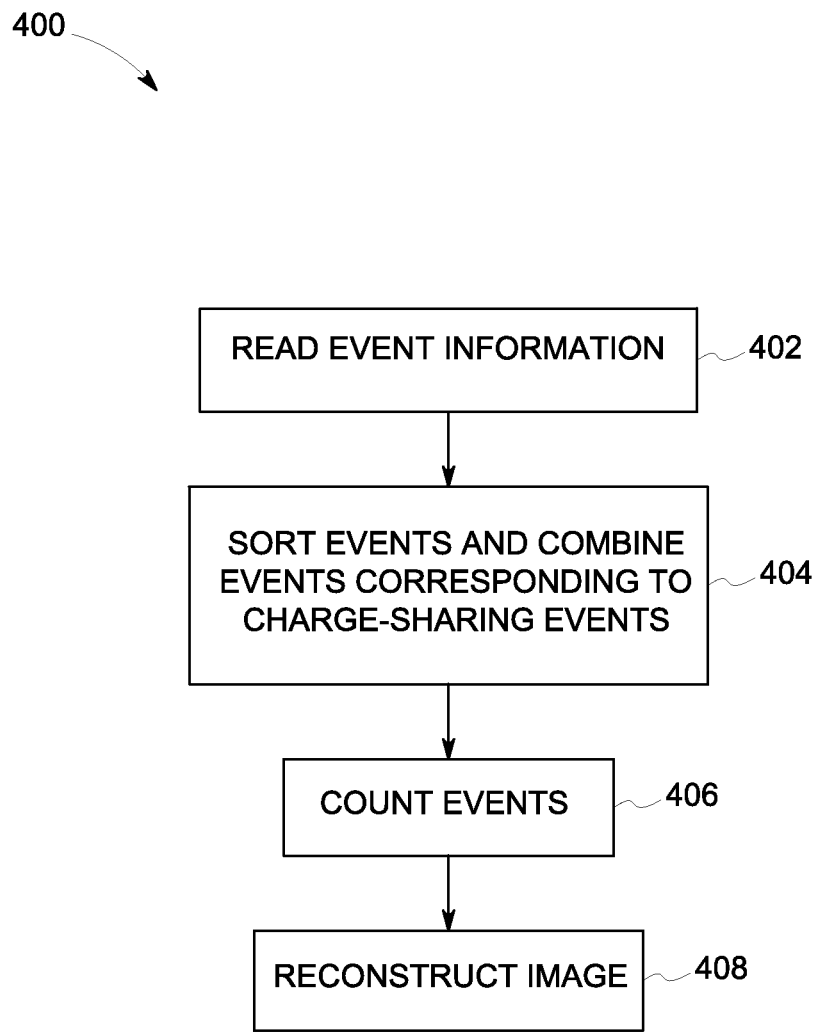
FIG. 5 is a flowchart of a method for generating an image in accordance with various embodiments.

FIG. 5 is a flowchart of an exemplary method for processing event information generated by imaging a subject (e.g., human or animal patient, or other objects) in accordance with various embodiments. According to some embodiments, the method 400 may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware to perform one or more operations described herein.

Referring to FIG. 5, the exemplary method 400 includes receiving event information at the main processing unit 228 and the event processing module 230 from the DAS 232 for each event detected by each of the pixels of a detector 210, 212 (or cameras) in step 402. For example, the detector may include multiple pixels configured to receive energy during an imaging scan. In some embodiments, the energy may be received in a nuclear medicine (NM) scan such as PET or SPECT, and the energy received may include photons striking one or more pixels of the detector, where the photons are from a radiopharmaceutical isotope that has previously been administered to a patient. For example, the event information according to various embodiments may include identification of the detector/detector module, location of the pixel, and energy level information corresponding to the energy or charge detected by the pixel, which may be measured by one or more of an electrical current or voltage that corresponds to or is proportional to the energy or charge received or collected by the pixel.

The event information received in step 402 is processed by the event processing module 230 of the main processing unit 228 in the order in which the events are received or chronological order. The high rate of detection by the detector and processing of events by the main processing unit 228 and the event processing module 230 allows very little chance for events to improperly intervene between events corresponding to a charge-sharing event. However, various embodiments take into account the possibility of such an occurrence by not only evaluating consecutive events, but also evaluating non-consecutive events or nearby events that are received. More particularly, each event that is received within a certain number of events from the event having a partial charge being processed (e.g., within a Maximum Displacement), for example, is evaluated to determine whether it should be paired or summed with the event being processed as corresponding to a charge-sharing event.

As used herein, "non-consecutive," "near" and "nearby" events mean events and/or charge-sharing events that are close to each other on the event list, but not necessarily received consecutively, and/or for which event information is received by the main processing unit close to each other in the order received but not necessarily received consecutively. Events and charge-sharing events as well as corresponding event information may be considered "non-consecutive," "nearby," or "near" each other even when there are events, charge-sharing events, and corresponding event information between them in the event list. Similarly, "non-consecutive," "near" and "nearby" pixels mean pixels that are disposed close to each other but not necessarily adjacent to each other such that there may be pixels between them.

Returning to FIG. 5, the event information received in step 402 is sorted and events associated with charge-sharing or Compton split events are combined as appropriate in step 404. According to various embodiments, the energy level value in the event information for each event is compared to a predetermined range of energy level values corresponding to an expected energy level value for the current imaging process. For example, the predetermined range of energy level values may be set to remove signals based solely on noise, or set to a range corresponding to a particular radiopharmaceutical that may be injected into the patient, or to expected measured energy levels, for example. When the energy level of an event falls within the predetermined range, it is identified as an event that is to be counted toward the events to be used for image reconstruction.

In one embodiment, the predetermined range (sometimes referred to as energy window) Em(i) (lower end of the energy window) to Ep(i) (the upper end of the energy window) is defined for each detector pixel. The predetermined range may be defined by measuring and analyzing the energy spectrum of a naked radioactive source for each pixel in the detector. Alternatively, a single predetermined range of energy level values may be used for all of the pixels (if the performances of all the pixels are similar or the same). If the energy level of an event is below the predetermined range, it is identified as a possible partial event or an event corresponding to a charge-sharing event during sorting in step 404. For each partial event or event corresponding to a charge-sharing event an attempt is made to combine the energy level of the event with the energy level of at least one other nearby partial event having an energy level value below the predetermined range of energy level values. The combined energy level value is compared to a combined predetermined range of energy level values which may be the same or different from the predetermined energy range for single events, and identified as an event to be counted or single event when the combined energy level value is within the combined predetermined range.

The size of the combined predetermined range of energy level values may be estimated for each pair of neighboring pixels by:

$DE(i,j) \sim \text{Sqrt}(DE(i)^2 + DE(j)^2)$, wherein:

The difference in energy for pixels "i" and "j" or DE(i,j) is proportional to the Full Width at Half Maximum (FWHM) of the combined predetermined range of energy level values for a combined event from pixel "i" and "j";

DE(i) is proportional to the (FWHM) of the predetermined range of energy level values for an event from pixel "i";

and DE(j) is proportional to the (FWHM) of the predetermined range of energy level values for an event from pixel "j". The size of the combined predetermined range of energy level values may be estimated for each pair of neighboring pixels.

Additionally, a "Charge Loss" value, CL[E(i),E(j)] (as disclosed in US Published Patent 20110297838, for example) may optionally be defined for each combined event. CL is the energy related to the charge lost in the gap between the two pixels. The value of CL[E(i),E(j)] may depend mainly on the ratio of E(i)/E(j)] and optionally also on the pixels "i" and "j". Accordingly:

for a non-combined event having original energy E0, the measured energy in pixel "i", EM(i) should be in the range E0−DE(i)/2<ME(i)<E0+DE(i)/2 to be considered as a valid event;

for a non-combined event having original energy E0, the measured energy in pixel "j", EM(j) should be in the range E0−DE(j)/2<ME(j)<E0+DE(j)/2 to be considered as a valid event; and for a combined event having original energy E0, the measured energy in pixels "i" and "j", together EM(i,j) should be in the range E0−DE(i,j)/2−CL[E(i),E(j)]<ME(i,j)<E0+DE(j)/2−CL[E(i),E(j)] to be considered as a valid combined event.

For non-symmetric spectra, DE may be replaced with the corresponding DEp and DEm (the positive and negative values for the corresponding edges of the valid ranges) such that:

$DEm(i,j) \sim \text{Sqrt}(DEm(i)^2 + DEm(j)^2);$ $DEp(i,j) \sim \text{Sqrt}(DEp(i)^2 + DEp(j)^2)$ For a non-combined event having original energy E0, the measured energy in pixel "i", EM(i) should be in the range E0−DEm(i)<ME(i)<E0+DEp(i) to be considered as a valid event; and for a combined event having original energy E0, the measured energy in pixels "i" and "j", together EM(i,j) should be in the range E0−DEm(i,j)−CL[E(i),E(j)]<ME(i,j)<E0+DEp(j)−CL[E(i),E(j)] to be considered as a valid combined event, where CL is the energy related to the charge lost in the gap between the two pixels.

For a single peak isotope, or the highest peak in the energy spectra, the upper limit of the energy window is of little importance as only a few (false) events are measured there (random coincidence of two events at the same time and place, and cosmic radiation). In contrast, the lower limit of the energy window is of importance since setting it high will exclude valid peak events from the data, while at the same time reduce the number of false "patient scattered" events in the data, while setting it low will allow more valid peak events in the data, while at the same time increase the number of false "patient scattered" events in the data. Thus, it is important to optimize the energy window lower limit. For a lower peak in a multiple peak spectra, the energy of the false "patient scattered" events overlap the energy range of the lower peak, thus, the importance of optimizing both of the energy window lower and upper limits. Optimizing the limits of energy window(s) for combined events follows the same logic.

In step 406, the events, including the single events, for each pixel of the detectors are counted toward the events to be used for image reconstruction. The events for each pixel, including the single events resulting from charge-sharing events, are used for image reconstruction in step 408.

In some embodiments, the predetermined energy level range or the combined predetermined energy level range used for processing events whose energies have been combined may be the same or different from the predetermined range of energy level values used for processing events occurring at one pixel location. For example, charge-sharing events often suffer from charge loss. Accordingly, energies of one or more events may not be summed to the original predetermined range of energy level values expected for the particular imaging process. As a result, a different range of energy level values may be used for determining whether the summed energy of a charge-sharing event corresponds to an event to be counted for image reconstruction.

According to various embodiments, the exemplary method 400 for processing event information received from detectors can be performed by the main processing unit 228 and the event processing module 230 substantially in real time as the events are detected and the event information is received by the main processing unit 228 and the event processing module 230 during the imaging process. In other embodiments, event information for each event for an imaging scan that is stored in the data storage device 236 or some other suitable memory device can be processed by the main processing unit 228 and the event processing module 230 offline at some point after the imaging process has been completed. In some other embodiments, processing the event information of an imaging process can be initiated at some point during the image scanning process or after the image scanning process has begun. The event information is processed by the main processing unit 228 and the event processing module 230 rather than by an ASIC, FPGA or other processor integrated with the detector or in the camera, which enables high speed processing including substantially real-time processing, if desired. If the communication and/or processing are delayed, a buffer or buffers can temporarily store the event information until the communication bandwidth or processing is available. In various embodiments, only events having an energy below the predetermined range of energy level values need to be stored in the buffer since these events are candidates for being combined with a new event. The list in the buffer may be kept short (e.g., 2-10 events) by discarding the oldest event when adding a new event that was just detected or received and the energy of the new event is below the predetermined range of energy level values. According to various embodiments, for each new event having energy below the predetermined range of energy level values, the buffer is searched for possible partners. If found, it is matched and combined and removed from the buffer.

In various embodiments, receiving event information in step 402 may also include correcting the energy generated in the pixel associated with an event to account for pixel to pixel variations prior to sorting and combining according to step 404. This correction process may include looking up a correction factor from a look-up table based on the address or location of the pixel and applying the correction factor to the energy level value of the pixel. The energy correction process may include subtracting a dark current or bias represented by A and multiplying by a factor B, which may be 1/Gain. In some cases, a non-linearity factor C may also be used such that $E'\leq-A+B*E+C*E*E$. In various embodiments, this energy correction is performed before the sorting and combining in step 404.

Figure 6:
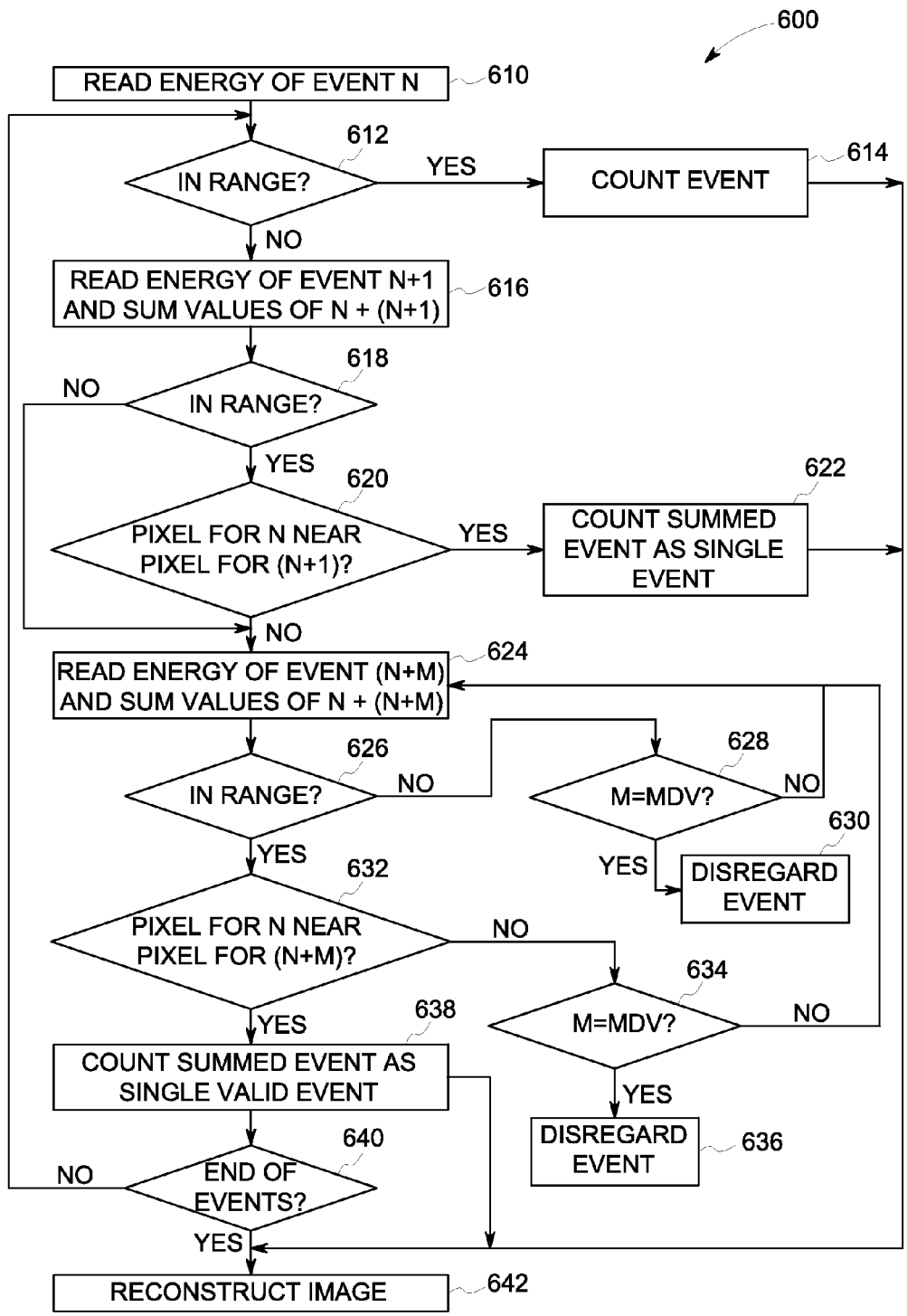
FIG. 6 is a flowchart of a method for sorting and combining events in accordance with various embodiments.

FIG. 6 is a flowchart of an exemplary process for the sort and combine step 404 shown in FIG. 5. The exemplary process 600 includes reading the energy or the energy level value from the received event information for each event detected during an imaging process in step 610 in the order in which the event information is received by the event processing module 230 of the main processing unit 228. In step 612, the energy or the energy level value of the event N being processed is compared to a predetermined range of energy level values. If the energy level of the event N is within the predetermined range, then processing continues to step 614 and the event N is determined to be an event that is counted in reconstructing the image in step 642. If it is determined that the energy level value is below the predetermined range of energy level values in step 612, then the energy or energy level value of the next event (N+1) received in order by the event processing module 230 is read and the energy level values of the event N and the event (N+1) are combined in step 616. The combined energy level value is then compared to the predetermined range of energy level values (or a different predetermined range of energy level values in some embodiments) in step 618. If the combined energy level is within the predetermined range of energy level values in step 618, then it is determined whether the pixel for event N is near the pixel for event (N+1) in step 620. Nearby pixels include adjacent pixels as well as non-adjacent pixels as previously described. If it is determined that the pixels for events N and (N+1), respectively, are near each other in step 620, then the combined energy level value or sum of the combined energies is determined to be a single event in step 622 and is counted for image reconstruction in step 642. If the combined energy level value in step 618 is not within the predetermined range of energy level values or if it is determined that the pixels for events N and (N+1), respectively, are not near each other in step 620, then processing continues to step 624.

In step 624, the energy or energy level value of the next event (N+M), where M=2, 3, 4, . . . , Maximum Displacement Value (MDV), received in order by the event processing module 230, is read and the energy level values of the event N and the event (N+M) are combined. The combined energy level value is then compared to the predetermined range of energy level values in step 626. When the combined energy level value is not within the predetermined range of energy level values, it is determined whether M=MDV in step 628. If M≠MDV, then processing returns to step 624. When it is determined that M=MDV, the event N is disregarded in step 630. If the combined energy is within the predetermined range of energy level values in step 626, then it is determined whether the pixel for event N is near the pixel for event (N+M) in step 632. If it is determined that the pixels for events N and (N+M), respectively, are not near each other in step 632, then it is determined whether M=MDV in step 634. When M≠ MDV, processing returns to step 624. When M=MDV in step 634, then the event N is disregarded in step 636. If it is determined that the pixels for events N and (N+M), respectively, are near each other in step 632, then the combined energy level value or sum of energies is counted as a single event or charge-sharing event in step 638 and counted for image reconstruction in step 642. If all of the events for an imaging procedure have been processed as indicated in step 640, then the image is ready to be reconstructed in step 642. If step 640 indicates that all of the events have not been processed, then processing returns to step 612.

A running total of the counted events, including the counted single events or charge-sharing events, is determined for each pixel. When all of the events for the image scanning process have been processed, the total count for each pixel may be used during image reconstruction. For example, the total count for each pixel may be used to determine a shade of a gray scale to be assigned to the pixel in the reconstructed image. In various embodiments, the higher the total of counted events the brighter the shade or higher the value along the gray scale assigned to the pixel. Accordingly, in various embodiments, the image is reconstructed from the events, including the single events, that have been sorted and combined.

Figure 7:
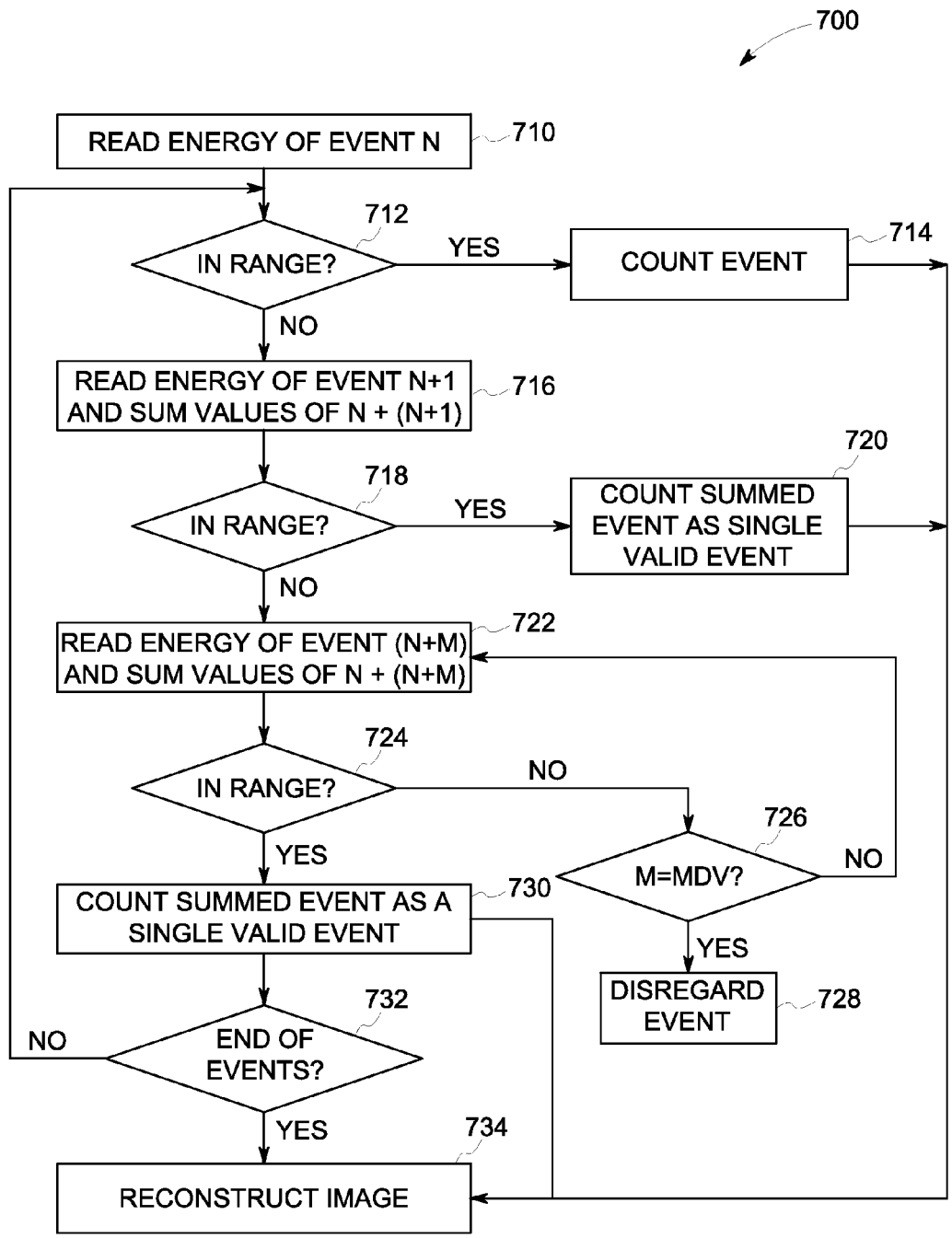
FIG. 7 is a flowchart of a method for sorting and combining events in accordance with various embodiments.

FIG. 7 is a flowchart of another exemplary process for the sort and combine step 404 shown in FIG. 5. Event information for each event is generated as events are detected and supplied to the main processing unit 228, including the event processing module 230. As a result, there is very little chance that event information corresponding to charge-sharing events will be received far from each other (or at significantly different times) or separated by more than a small number of other events. Unlike processors integrated with the detector or in the camera, such as ASICs, for example, the main processing unit 228 and the event processing module 230 are capable of high speed operation and process the event information as it is received. There is a high probability that events corresponding to a charge-sharing event will occur at pixels that are near each other. Therefore, in some embodiments, it is not necessary to confirm that the pixel location for an event N being processed is near a pixel corresponding to another event (N+M) that is identified for the charge-sharing event, as shown in FIG. 7.

Referring to FIG. 7, the exemplary method includes reading the energy or the energy level value from the event information for each event detected during an imaging process in the order of receipt in step 710. In step 712, the energy or the energy level value of the event N being processed is compared to the predetermined range of energy level values. If the energy level of the event N is within the predetermined range, then processing continues to step 714 and the event N is determined to be an event that is counted in reconstructing the image in step 734. If it is determined that the energy level value is below the predetermined range of energy level values in step 712, then the energy or energy level value of the next event (N+1) in order of receipt is read and the energy level values of the event N and the event (N+1) are combined in step 716. The combined energy level value is then compared to the predetermined range of energy level values (or a different predetermined range of energy level values in some embodiments) in step 718. If the combined energy level is within the predetermined range of energy level values in step 718, then the combined energy level value or sum of the combined energies is determined to be an event to be counted or a single event in step 720 and is counted for image reconstruction in step 734. If the combined energy level value in step 718 is not within the predetermined range of energy level values, then processing continues to step 722. In step 722, the energy or energy level value of the next event (N+M) where M=2, 3, 4, ..., MDV, in order of receipt is read and the energy level values of the event N and the event (N+M) are combined. The combined energy level value is then compared to the predetermined range of energy level values in step 724. When the combined energy level value is not within the predetermined range of energy level values, it is determined whether M=MDV in step 726. If M≠MDV, then processing returns to step 722. When it is determined that M=MDV, the event N is disregarded in step 728. If the combined energy is within the predetermined range of energy level values in step 724, then the combined energy level value or sum of energies is counted as a single event in step 730 and counted for image reconstruction in step 734. If all of the events for an imaging procedure have been processed as indicated in step 732, then the image can be reconstructed in step 734. If step 732 indicates that all of the events have not been processed, then processing returns to step 712.

A running total of the counted events, including the counted single events, is determined for each pixel. When all of the events for the image scanning process have been processed, the total count for each pixel may be used to generate the image, as discussed in more detail above.

Figure 8:
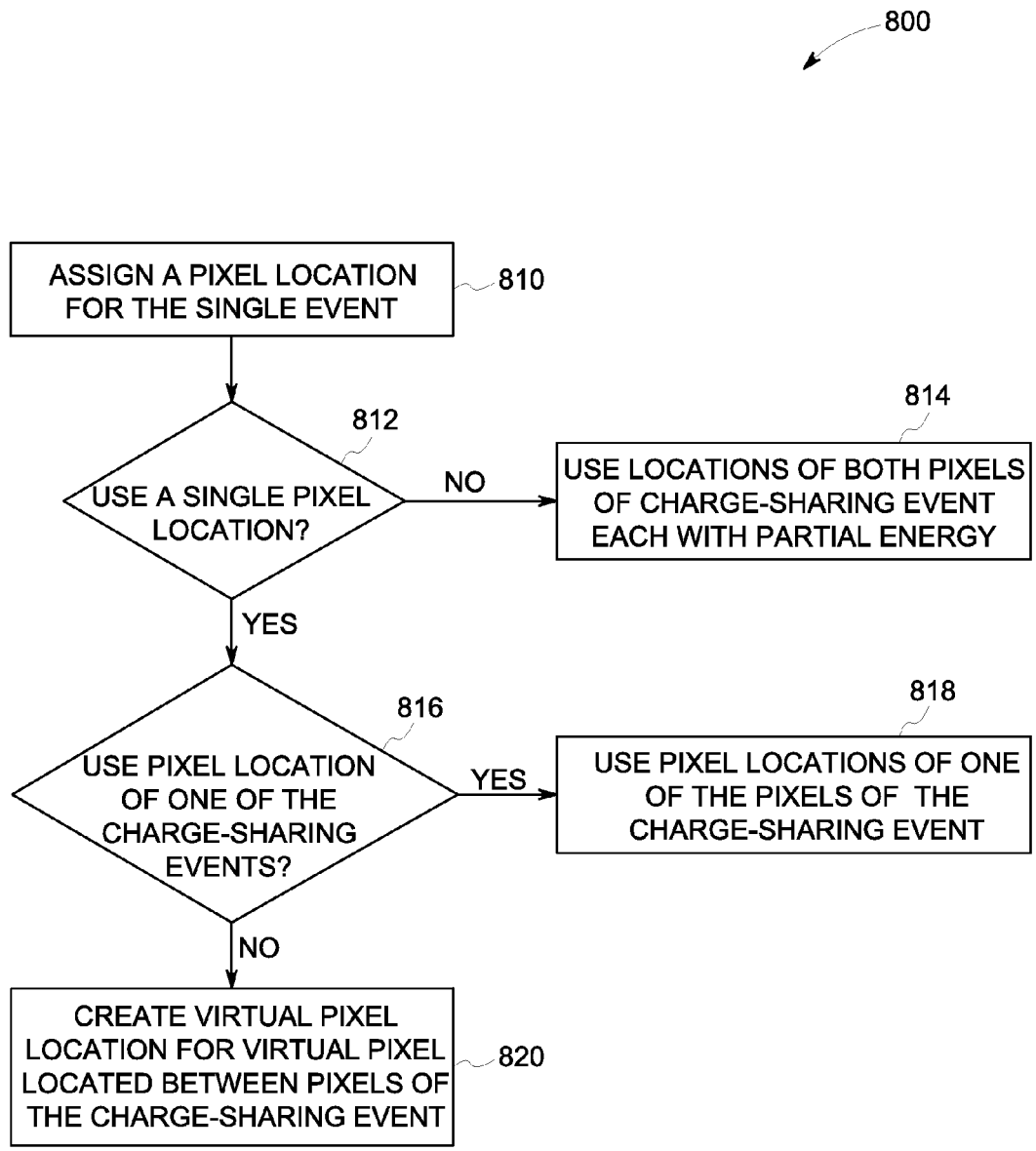
FIG. 8 is a flowchart of a method for assigning at least one pixel position to a charge-sharing event in accordance with various embodiments.

FIG. 8 is a flowchart of an exemplary process for assigning at least one pixel location to a single event or a charge-sharing event in steps 622, 638, 720 and 730 shown in FIGS. 6 and 7. The exemplary process 800 includes assigning a pixel location for the single event or charge-sharing event in step 810. In step 812, it is determined whether the single event should be assigned to a single pixel location. If the answer in step 812 is no, then the single event is assigned to the pixel locations of the combined events, each location having a partial energy. For example, each pixel location may include half of the energy associated with the charge-sharing event, or the energy may be apportioned based on the relative values of the energies of the pixels of the charge-sharing event, or the energy may be randomly partitioned.

If the answer in step 812 is yes, then processing continues to step 816. In step 816, it is determined whether the charge-sharing event should be assigned to the pixel location of one of the pixels associated with the charge-sharing event. If the answer in step 816 is yes, then in step 818, the pixel location of one of the pixels associated with the charge-sharing event is assigned as the pixel location. For example, the pixel location for the charge-sharing event may be randomly chosen or assigned, or the pixel location for the event in the charge-sharing event having the highest energy level value may be assigned as the pixel location for the charge-sharing event. Other suitable criteria may be used to assign the pixel location for the single valid event or charge-sharing event to one of the pixel locations for the events associated with the charge-sharing event.

If the answer in step 816 is no, then in step 820, a virtual pixel location is created between the pixel locations of the events associated with the charge-sharing event and the pixel location for the single event is assigned to the virtual pixel location. In various embodiments, for example, the virtual pixel location may be between the pixel locations of the events associated with the charge-sharing event. If one event is located at pixel location (2, 6), and the pixel location of another event is located at pixel location (2, 8), then the virtual pixel location may be located at (2, 7), for example. The virtual pixel location may also be determined during a rebinning process, or any other suitable method.

Some technical effects of at least some embodiments include improved image quality, reduced processing time, real-time processing of events for image reconstruction, use of conventional detectors and/or cameras. Another technical effect of at least some embodiments is improved accuracy of nuclear medicine (NM) imaging scans and other imaging scans and a reduction in complexity, cost and/or time required for imaging procedures. Another technical effect of at least some embodiments includes improved identification of shared-charge events and incidents of Compton Scattering in the detector, and use of such events or incidents in imaging and improved recognition and counting of events suitable for use with imaging while discarding events not suitable for imaging.

Thus, in various embodiments, event information for events detected by a detector, including events corresponding to charge-sharing events, is processed in the order of receipt by the main processing unit of an imaging system having an event processing module. The processing by the event processing module enables substantially real-time processing of event information used for image reconstruction, if desired. The event processing module sorts events based on event information and sums the energies of two or more events received near each other and corresponding to charge-sharing or Compton Scattering in the detector, without requiring or employing the use of time-coincidence measurements. In various embodiments, charge-sharing events may be combined even when they are not received consecutively from the detector. For example, if a first event of received energy is identified as having partial energy or as a charge-sharing event for a first pixel, a second immediately subsequent event recorded for another pixel is not identified as a charge-sharing event, and a third event is received later for another nearby pixel having an energy corresponding to a charge-sharing event, the energies for the first and third events may be combined to form a single event or a charge-sharing event to be counted for image reconstruction in some embodiments even though the first and third events were not consecutive. Events to be counted, including single or charge-sharing events, sorted and combined by the event processing module of the main processing unit are used for image reconstruction.

The pixelated detectors of the various embodiments may be provided as part of different types of imaging systems, for example, NM imaging systems such as PET imaging systems, SPECT imaging systems and/or X-ray imaging systems and CT imaging systems, among others. For example, It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system, comprising:
   a detector comprising multiple pixels, each of the pixels configured to detect events corresponding to energy received during an imaging process, wherein the detector generates event information for each event detected by each of the pixels; and
   a processing unit comprising a memory for storing the event information and an event processing module having a processor configured to:
      read the event information for each event detected by each of the pixels of the detector during the imaging process in order of receipt from the detector;
      compare an energy level value in the event information for each event to a predetermined range of energy level values;
      count the event when the energy level value in the event information is within the predetermined range of energy level values;

read, for each event having an energy level value below the first predetermined range of energy level values, the energy level value for at least one next consecutive event in the order received from the detector, and determine a combined energy level value of the event and the at least one next consecutive event;

determine whether a pixel location for the event is near a pixel location for the at least one next consecutive event;

count the combined energy level value as a single event when the combined energy level value is within a combined predetermined range of energy level values and when the pixel location of the event is near the pixel location for the at least one next consecutive event; and assign at least one pixel location for the single event.

2. The system of claim 1, wherein the event processing module is configured to reconstruct an image using each of the counted events.

3. The system of claim 1, wherein the event processing module is configured to process the event information substantially in real time upon receipt of the event information for each event detected by each of the pixels in the detector.

4. The system of claim 1, wherein the predetermined range of energy level values is different from the combined predetermined range of energy level values.

5. The system of claim 1, wherein the event processing module is configured to assign the at least one pixel location for the single event to one of a pixel location of the event or a pixel location of one of the at one next consecutive event.

6. The system of claim 1, wherein the event processing module is configured to assign the at least one pixel location for the single event to each of a pixel location of the event and a pixel location of one of the at least one next consecutive event, and wherein the event processing module is further configured to divide the combined energy level value of the single event into two energy level values and assign one energy level value to the pixel location of the event and another energy level value to the pixel location of the at least one next consecutive event.

7. The system of claim 6, wherein the two energy level values each represent half of one of the combined energy level value.

8. The system of claim 1, wherein the event processing module is configured to generate a virtual pixel location for the single event; and wherein the assigning step comprises assigning the single event to the virtual pixel location.

9. The system of claim 1, wherein the imaging system is a nuclear medicine imaging system.

10. A method, comprising:
reading event information for each event detected by each pixel of a multi-pixel detector during an imaging process in order of receipt from the detector;
comparing an energy level value of an event in the event information for each event to a predetermined range of energy level values;
counting the event when the energy level value in the event information is within the predetermined range of energy level values;
reading, for each event having an energy level value below the predetermined range of energy level values, the energy level value for at least one next consecutive event in the order of event information received from the detector, and determine a combined energy level value of the event and the at least one next consecutive event;

determining whether a pixel location for the event is near a pixel location for the at least one next consecutive event;

counting the combined energy level value as a single event when the combined energy level value is within a combined predetermined range of energy level values and when the pixel location of the event is near the pixel location for the at least one next consecutive event; and assigning at least one pixel location for the single event.

11. The method of claim 10, further comprising generating an image using each of the counted events.

12. The method of claim 10, wherein processing the event information is performed substantially in real time upon receipt of the event information for each event detected by each of the pixels in the detector.

13. The method of claim 10, wherein the predetermined range of energy level values is different from the combined predetermined range of energy level values.

14. The method of claim 10, wherein the assigning step comprises assigning the at least one pixel location for the single event to one of a pixel location of the event or a pixel location of the at least one next consecutive event.

15. The method of claim 10, wherein the assigning step comprises assigning the at least one pixel location for the single event to each of a pixel location of the event and a pixel location of the at least one next consecutive event, and wherein the assigning step further comprises dividing the combined energy level value into two energy level values and assigning one energy level value to the pixel location of the event and another energy level value to the pixel location of the at least one next consecutive event.

16. The method of claim 10, further comprising generating a virtual pixel location for the single event, wherein the assigning step comprises assigning the single event to the virtual pixel location.

17. A method, comprising:
reading event information for each event detected by each pixel of a multi-pixel detector during an imaging process in order of receipt from the detector;
sorting events based on the event information to identify events to be counted for image reconstruction and events having an energy level value below a predetermined range of energy level values;
combining the energy level values of events having an energy level below the first predetermined range of energy level values and having pixel locations that are near each other;
comparing each of the combined energy level values to a combined predetermined range of energy level values and counting the combined energy level value as a single event when the combined energy level value is within the combined predetermined range of energy level values; and
assigning at least one pixel location to each of the single events.

18. The method of claim 17, further comprising reconstructing an image using each of the counted events.

19. A system, comprising:
a camera having a detector comprising multiple pixels, each of the pixels configured to detect events corresponding to energy received during an imaging process, wherein the detector generates event information for each event detected by each of the pixels; and
a processing unit comprising a memory to store the event information and an event processing module having a processor configured to:

read event information for each event detected by each pixel of a multi-pixel detector during an imaging process in order of receipt from the detector;

sort events based on the event information to identify events to be counted for image reconstruction and events having an energy level value below a predetermined range of energy level values;

combine the energy level values of events having an energy level below the predetermined range of energy level values and having pixel locations that are near each other;

compare each of the combined energy level values to a combined predetermined range of energy level values and counting the combined energy level value as a single event when the combined energy level value is within the combined predetermined range of energy level values; and assign at least one pixel location to each of the single events.

20. The imaging system of claim 19, wherein the event processing module is further configured to reconstruct an image using each of the counted events.

21. The imaging system of claim 19, wherein the processing unit is a general purpose computer.

* * * * *